United States Patent [19]

Morris et al.

[11] Patent Number: 4,623,711

[45] Date of Patent: Nov. 18, 1986

[54] MODIFIED DISULFIDE POLYMER COMPOSITION AND METHOD FOR MAKING SAME FROM MERCAPTAN TERMINATED DISULFIDE POLYMER AND DIETHYL FORMAL MERCAPTAN TERMINATED POLYSULFIDE

[75] Inventors: Lester Morris, Encino; Hakam Singh, Bradbury, both of Calif.

[73] Assignee: Products Research & Chemical Corp., Glendale, Calif.

[21] Appl. No.: 768,402

[22] Filed: Aug. 21, 1985

[51] Int. Cl.$^4$ .............................................. C08G 75/12
[52] U.S. Cl. ..................................... 528/375; 528/374
[58] Field of Search ............................... 528/375, 374

[56] References Cited

U.S. PATENT DOCUMENTS

| | | | |
|---|---|---|---|
| 3,770,678 | 11/1973 | Paul | 528/375 |
| 3,923,754 | 12/1975 | Pellico | 528/375 |
| 4,425,389 | 1/1984 | Schöllhorn et al. | 528/375 |

*Primary Examiner*—Harold D. Anderson
*Attorney, Agent, or Firm*—Poms, Smith, Lande & Rose

[57] ABSTRACT

A liquid polymer composition curable to a solid elastomer having good thermal stability which contains a mercaptan terminated disulfide polymer of the formula $HS(RSS)_m R'SH$ wherein R is $-C_2H_4-O-CH_2O-C_2H_4-$; R' is a member selected from the group consisting of alkyl of from 2 to 12 carbon atoms; alkyl thioether of from 4 to 20 carbon atoms; alkyl ether of from 4 to 20 carbon atoms and one oxygen atom; alkyl ether of from 4 to 20 carbon atoms and from 2 to 4 oxygen atoms each of which is separated from the other by at least 2 carbon atoms, alicyclic of from 6 to 12 carbon atoms and aromatic lower alkyl; and the value of m is such that mercaptan terminated disulfide polymer has a molecular weight of between 1,000 to about 4,000. The method includes cleaving a polymer having disulfide linkages with an organic dimercaptan in the presence of an organic amine.

23 Claims, No Drawings

MODIFIED DISULFIDE POLYMER COMPOSITION AND METHOD FOR MAKING SAME FROM MERCAPTAN TERMINATED DISULFIDE POLYMER AND DIETHYL FORMAL MERCAPTAN TERMINATED POLYSULFIDE

BACKGROUND OF THE INVENTION

The present invention relates to chemically modified liquid polymer compositions having a relatively low molecular weight of between about 1,000 and about 4,000 which, surprisingly cure to elastomers having excellent thermal stability. Certain of these chemically modified liquid polymer compositions when cured to solid elastomers also have surprisingly high tensile strength, and excellent fuel resistance. In addition, and even more surprisingly, the adhesion of such cured compositions improves after being in contact with fuel. The polymer compositions of the present invention are produced by cleaving some of the disulfide linkages occurring in certain mercaptan terminated liquid polymers with certain organic dimercaptan compounds in the presence of an organic amine catalyst.

Polymers having disulfide linkages are often times referred to as polysulfides which are commercially available under the name Thiokol polysulfides. Such polysulfide polymers are disclosed in U.S. Pat. No. 2,466,963 which issued in 1949. Certain polymers prepared according to this patent have molecular weights on the order of about 1,000 to about 8,000 which are viscous liquids having viscosities within the range of about 1,500 to 150,000 centipoise and have repeating units of diethyl formal disulfide with terminal mercaptan groups, such polymers being hereinafter referred to as diethyl formal mercaptan terminated polysulfides. When such polymers are cured or hardened, they form rubberlike solids having a number of excellent properties including resistance to oil, organic liquids, water, etc. Moreover, such polymers are resistant to ozone or sunlight and are relatively impermeable to gases and moisture. As a result, diethyl formal mercaptan terminated polysulfides have been used widely in sealant, adhesive and coating compositions.

Although the diethyl formal mercaptan terminated polysulfides can be cured to provide useful products, there is a distinct need in the art to improve upon various properties of the liquid diethyl formal mercaptan terminated polysulfides and to provide new compositions which have valuable properties and characteristics not exhibited by the available diethyl formal mercaptan terminated polysulfides.

For example, the low molecular weight, low viscosity diethyl formal mercaptan terminated polysulfides cure only to elastomers having poor thermal stability, low tensile strength and poor adhesion. The higher molecular weight, higher viscosity diethyl formal mercaptan terminated polysulfides, although not having good thermal stability, do exhibit other good properties, such as good adhesion and good tensile strength when cured. However, these properties are only achieved with diethyl formal mercaptan polysulfides having such high viscosities that it is necessary to use solvents to lower the viscosity to facilitate their use in adhesives, sealants and coatings. In addition, such high viscosities limit the amount of additives, such as fillers, pigments and plasticizers which diethyl formal mercaptan terminated polysulfides are compounded with.

The chemically modified disulfide liquid polymer compositions of the present invention have, when cured, greatly improved thermal stability when compared to diethyl formal mercaptan terminated polysulfides having similar molecular weights and viscosities. Certain of the chemically modified disulfide liquid polymer compositions of the present invention when cured and when compared to diethyl formal mercaptan terminated polysulfides have:
1. Superior resistance to ultraviolet light;
2. Higher tensile strength;
3. Higher tear strength;
4. Superior resistance to higher temperatures;
5. Superior resistance to fuel;
6. Greater compatibility with traditional plasticizers used in compounding diethyl formal mercaptan terminated polysulfides; and, most surprisingly,
7. Greater adhesion after exposure to organic liquid such as aromatic hydrocarbon fuel.

The chemically modified disulfide polymer compositions of the present invention which have the seven properties enumerated above also do not require solvents to lower their viscosities and therefore are extremely useful in sealant, coating or adhesive formulations. The elimination of solvents is extremely advantageous because solvents are very toxic, and, moreover, pose a flammability hazard in such formulations. Such nonsolvent based elastomers are particularly beneficial in providing insulating glass sealant formulations since the stress caused by shrinkage during solvent evaporation is eliminated. Furthermore, such low viscosity solvent free polymer compositions permit inclusion of greater amounts of reinforcing pigments and extenders without loss of other desirable properties of critical specification viscosity requirements in insulating glass, construction, and aircraft sealants. In addition, the disulfide polymer compositions of the present invention are less expensive since the added ingredients, such as plasticizers and pigments, normally cost less per gallon than diethyl formal mercaptan terminated polysulfides.

SUMMARY OF THE INVENTION

In accordance with the present invention, chemically modified disulfide liquid polymer compositions are provided which, when cured to solid elastomers, have greater thermal stability than diethyl formal mercaptan terminated polysulfides having similar molecular weights and viscosities. Certain of the chemically modified disulfide liquid polymer compositions, when cured, have greatly improved properties when compared to diethyl formal mercaptan terminated polysulfides. Some of these properties include greater tensile strength, before and after environmental exposure to water and fuel, greater adhesion after exposure to fuel and improved compatibility with a vast number of formulating ingredients including plasticizers.

The present invention is based on the very surprisingly discovery that when liquid diethyl formal mercaptan polysulfides having a molecular weight of between about 2,000 and 8,000 and having a viscosity of between about 10,000 to 150,000 centipoise are reacted with a certain kind of organic dimercaptan, one of the reaction products is a chemically modified diethyl formal polysulfide having terminal mercaptan groups (hereinafter referred to as "mercaptan terminated disulfide polymer"). This reaction cleaves one or more of the disulfide linkages and therefore, a second reaction product, present in the chemically modified liquid polymer composition of the present invention, is a liquid diethyl formal mercaptan polysulfide which is identical to the starting liquid diethyl formal mercaptan terminated polysulfide except the second reaction product has a lower molecular weight (from about 1,000 to about 4,000). It is not necessary, in every instance, (e.g., when the molecular weight of the starting liquid diethyl formal mercaptan terminated polysulfide is between about 2,000 and about 4,000), to react all of the starting diethyl formal mercaptan terminated polysulfide with the organic dimercaptan. Thus some of the starting diethyl formal mercaptan terminated polysulfide may be present in the chemically modified disulfide liquid polymer composition of the present invention. However, the chemically modified disulfide liquid polymer composition must contain at least about 25 mole percent of the mercaptan terminated disulfide polymer.

The liquid disulfide polymer composition of the present invention, which must contain at least 25 mole percent of the mercaptan terminated disulfide polymer and may be composed primarily of the mercaptan terminated disulfide polymer, possesses surprising properties which were not expected and which are much better and different than diethyl formal mercaptan terminated polysulfides. The novel mercaptan terminated disulfide polymers and the chemically modified liquid polymer compositions of the present invention have an average molecular weight of between 1,000 to about 4,000 and a viscosity, at 25° C., of between about 1,500 to 45,000 centipose. The preferred molecular weight is between about 1,000 to about 2,500. One reason this is the preferred molecular weight range is because within this range one may eliminate the use of solvents when using the composition in sealant, coating or adhesive formulations. When the novel disulfide liquid polymer compositions of the present invention are cured they possess the desirable properties of the original diethyl formal mercaptan polysulfides in that the elastomers formed therefrom are resistant to oil, organic liquids, water, acids, alkalis and resist attack by ozone or sunlight. Furthermore, the cured compositions of the present invention are impermeable to gases and moisture.

Certain of the chemically modified disulfide liquid polymer compositions of the present invention have very surprising and unusual properties. These polymer compositions are included within the more broadly defined mercaptan terminated disulfide containing compositions of the present invention but are specific compositions containing disulfide polymers having thioether linkages and mercaptan terminals, such polymers are hereinafter referred to as thioether mercaptan terminated disulfides. The chemically modified disulfide liquid polymer compositions of the present invention containing the thioether mercaptan terminated disulfide polymers are produced as set forth above (i.e. cleavage of liquid diethyl formal mercaptan polysulfides at one or more of the disulfide linkages), the cleaving organic dimercaptan being an organic thioether dimercaptan. The resulting chemically modified disulfide liquid polymer composition (hereinafter, when referred to specifically, such composition will be called a thioether mercaptan terminated disulfide liquid polymer composition) will have an average molecular weight of between about 1,000 to 4,000 (preferably between about 1,000 to 2,500) and a viscosity, at 25° C., of between about 1,500 to 45,000 centipoise. The thioether mercaptan terminated disulfide liquid polymer composition will contain at least 25 mole percent of thioether mercaptan terminated disulfide, based on the total moles of thioether mercaptan terminated disulfide and diethyl formal mercaptan polysulfide present in the liquid polymer composition.

The thioether mercaptan terminated disulfide liquid polymer compositions of the present invention, when cured, surprisingly possess greater strength and better heat resistance than the original diethyl formal mercaptan terminated polysulfides from which the composition was, in part, made even though the original diethyl formal mercaptan terminated polysulfide has a much higher molecular weight and viscosity than the chemically modified thioether mercaptan terminated disulfide liquid polymer composition of the present invention.

DETAILED DESCRIPTION OF THE INVENTION

The present invention involves, in part, splitting or cleaving the disulfide linkages of diethyl formal mercaptan terminated polysulfides with a dimercaptan organic cleaving compound to form a novel mercaptan terminated disulfide polymer having very unusual and unexpected properties. Depending upon the amount of organic cleaving compound used in the reaction relative to the amount of diethyl formal mercaptan terminated polysulfide, the resulting reaction product may contain about 90 mole percent of the novel mercaptan terminated disulfide polymers. The remaining portion of the mixture will be diethyl formal mercaptan terminated polysulfides. Thus, in practice, the chemically modified liquid polymer compositions of the present invention will contain about 25 mole percent to about 90 mole percent of mercaptan terminated disulfide polymers and from about 10 mole percent to about 75 mole percent of diethyl formal mercaptan terminated polysulfides. Because an equilibration occurs, there is basically a uniform distribution of polymer molecular weight and therefore the average molecular weight of both the mercaptan terminated disulfide polymers and the diethyl formal mercaptan terminated polysulfides in the liquid polymer composition of the present invention are between about 1,000 and about 4,000.

The mercaptan terminated disulfide polymer will have the formula $HS(RSS)_mR'SH$ wherein R is $—C_2H_4—O—CH_2—O—C_2H_4—$; R' is a divalent member selected from the group consisting of alkyl of from 2 to 12 carbon atoms; alkyl thioether of from 4 to 20 carbon atoms; alkyl ether of from 4 to 20 carbon atoms and one oxygen atom; alkyl ether of from 4 to 20 carbon atoms and from 2 to 4 oxygen atoms each of which is separated from the other by at least 2 carbon atoms, alicyclic of from 6 to 12 carbon atoms and aromatic lower alkyl, and the value of m is such that the molecular weight of the mercaptan terminated disulfide polymer is between about 1,000 to 4,000 and preferably between about 1,000 to about 2,500. Thus, in general, depending on the molecular weight of R', the value of m will be between about 5 to about 25 and preferably between about 5 to about 15.

The diethyl formal mercaptan terminated polysulfide polymer which may be included in the liquid composition of the present invention will have the formula $HS(RSS)_nRSH$ wherein R has the same significance as set forth above and the value of n will be such that the molecular weight of the diethyl formal mercaptan terminated polysulfide polymer is between about 1,000 and about 4,000 and preferably between about 1,000 and about 2,500. Thus, the value of n will, in general, range from about 5 to about 25 and, preferably, from about 5 to about 15.

If the chemically modified liquid disulfide polymer compositions of the present invention contain about 25 mole percent to about 90 mole percent of mercaptan terminated disulfide polymer and from about 10 mole percent to about 75 mole percent of diethyl formal mercaptan terminated polysulfide, the average values of m and n are such that the liquid polymer composition has an average molecular weight of about 1,000 to about 4,000. Thus, the average value of m and n depends on the respective amounts of the diethyl formal mercaptan terminated polysulfide and mercaptan terminated disulfide polymer present in the composition.

The starting diethyl formal mercaptan terminated polysulfide has an identical structure to the cleaved diethyl formal mercaptan terminated polysulfide reaction product except the starting polysulfide has a molecular weight of from about 2,000 to 8,000. The formula of the starting diethyl formal mercaptan terminated polysulfide may be represented as follows:

$HS(RSS)_pRSH$ wherein R is $—C_2H_4—O—CH_2—O—C_2H_4—$ and the value of p is such that the polymer has a molecular weight of about 2,000 to about 8,000 and thus, in general, p is between about 10 and 50.

The amount of organic dimercaptan cleaving compound, relative to the amount of diethyl formal mercaptan terminated polysulfide affects the average molecular weight of the polymers comprising the reaction products as well as the relative amounts of the cleaved diethyl formal mercaptan terminated polysulfide and mercaptan terminated disulfide polymer. If, for example, the molar ratio of the two starting reactants are equal, the molecular weight of the disulfide polymer composition of the present invention will be approximately 50% of the molecular weight of the diethyl formal mercaptan terminated polysulfide reactant. Similarly, the disulfide polymer composition will be composed of about 50 mole percent of mercaptan terminated disulfide polymer and about 50 mole percent of the cleaved diethyl formal mercaptan terminated polysulfide. If the amount of organic dimercaptan cleaving compound is increased relative to the amount of starting diethyl formal mercaptan terminated polysulfide, this further decreases the average molecular weight of the reaction product but increases the amount of mercaptan terminated disulfide relative to the amount of diethyl formal mercaptan polysulfide. For example, if the starting diethyl formal mercaptan terminated polysulfide reactant has a molecular weight of about 8,000 and it is desired to reduce the molecular weight of the liquid polymer composition of the present invention to about 1,000 (i.e., the molecular weight of the liquid polymer composition is about 10% of the molecular weight of the starting diethyl formal mercaptan terminated polysulfide) then 7 moles of organic dimercaptan cleaving compound should be used per mole of starting diethyl formal mercaptan terminated polysulfide. Additionally, for this example, the amount of mercaptan terminated disulfide in the liquid polymer composition would be approximately 90 mole percent and the amount of diethyl formal mercaptan terminated polysulfide would be approximately 10 mole percent. It should be noted that the actual reduction in molecular weight of the liquid polymer composition of the present invention depends to a very slight extent on the molecular weight of the organic dimercaptan cleaving compound. In any event, since the starting diethyl formal mercaptan terminated polysulfide has a maximum molecular weight of 8,000 and since the liquid polymer composition of present invention has a minimum molecular weight of about 1,000, the maximum organic dimercaptan cleaving compound which should be used would be about 7 moles per mole of starting diethyl formal mercaptan terminated polysulfide when the diethyl formal mercaptan terminated polysulfide has a molecular weight of 8,000. If the molecular weight of the starting diethyl formal mercaptan terminated polysulfide was about 4,000 and it was desired that the molecular weight of the resulting liquid polymer composition of the present invention be about 1,000, the amount of organic dimercaptan cleaving compound used would be 3 moles to each mole of starting diethyl formal mercaptan terminated polysulfide. The resulting composition would also be composed of approximately 75 mole percent of mercaptan terminated disulfide and approximately 25 mole percent of diethyl formal mercaptan terminated polysulfide.

If one desires to start with a diethyl formal mercaptan terminated polysulfide of molecular weight of about 4,000 or less and one further desires to have the molecular weight of the resulting liquid polymer composition be greater than about 2,000, then, more starting diethyl formal mercaptan terminated polysulfide is used than organic dimercaptan cleaving compound. For example, if the amount of organic dimercaptan cleaving compound is one-third mole per mole of starting diethyl formal terminated polysulfide then the resulting liquid polymer composition would have an average weight of about 3,000 and the molar percentage in the liquid polymer composition of mercaptan terminated disulfide polymer would be about 25 mole percent, with the other 75 mole percent composed of diethyl formal mercaptan terminated polysulfide. This is not to say that the molecular weight of the starting diethyl formal mercaptan terminated polysulfide would be 4,000 and the average molecular weight of the cleaved diethyl formal mercaptan terminated polysulfide would be approximately 2,000. Because of equilibration which causes relatively uniform distribution of polymer molecular weight, the polymers in the resulting liquid polymer composition have a molecular weight of approximately 3,000, variations being about plus or minus 500.

In summary, the average molecular weight of the polymers produced by the reaction will have from about 75 percent to 10 percent of the molecular weight of the starting diethyl formal mercaptan terminated polysulfide and the amount of mercaptan terminated disulfide in the liquid polymer composition will range from approximately 25 mole percent to as high as 90 mole percent. These ranges are produced by varying the molar ratio of organic dimercaptan cleaving compound to the starting diethyl formal mercaptan terminated polysulfide between about 0.3:1 to 7:1 and by choosing the appropriate molecular weight of the starting diethyl formal mercaptan terminated polysulfide.

The preferred starting diethyl formal mercaptan terminated polysulfides are those available under the name Thiokol polysulfides which are usually produced in commercial practice by the condensation of dichloro diethyl formal with an alkali polysulfide in the presence of a polyfunctional branching agent such as 1,2,3-trichloro propane. If no branching agent is used then the polymer is linear and if a branching agent is used then the polymer is branched.

The Thiokol polysulfides used in the present invention are those in which R is diethyl formal and are commercially available in various grades known as LP-2, LP-12, LP-31 and LP-32. These polymers are produced and sold by Morton Thiokol Chemical Corporation, Chicago, Ill. All of these polymers except LP-31 have a molecular weight of about 4,000 and have a viscosity of about 45,000 centipoise at 25° C. LP-31 has a molecular weight of about 8,000 and a viscosity of about 150,000 at 25° C. LP-31 and LP-32 contain about 0.5 mole percent of trifunctional groups which are available for branching. LP-2 contains about 2 mole percent and LP-12 contains about 0.2 mole percent of tri-functional groups which are available for branching. Other molecular weight grades and types of liquid Thiokol polysulfides, providing the repeating unit is diethyl formal disulfide, may be employed with results similar to those achieved with LP-2, LP-12, LP-31 and LP-32 which are the preferred diethyl formal mercaptan terminated polysulfide reactants.

As noted above, the cleavage reaction is carried out by mixing the diethyl formal mercaptan terminated polysulfide with the organic dimercaptan cleaving compound, the molar ratio of organic dimercaptan cleaving compound to diethyl formal mercaptan terminated polysulfide being about 0.3:1 to about 7:1 which, as noted, will reduce the molecular weight of the disulfide polymer composition to between three-fourths and one-eighth based on the original molecular weight of the diethyl formal mercaptan terminated polysulfide. Of course, this reduction will vary to some extent depending upon the molecular weight of the organic dimercaptan cleaving compound.

In conducting the reaction, the temperature is not particularly critical but is preferably between about ambient temperature (e.g. 25° C.) and 100° C. The reaction is preferably carried out under an inert atmosphere such as nitrogen at atmospheric pressure.

In general, the reaction will proceed without a catalyst, but the reaction time is so long (in excess of 40 hours) that the process is not economically viable. We have surprisingly discovered that the reaction time can be reduced considerably by using an organic amine catalyst having a pKb of 10 or above. Preferred organic amine catalysts are organic tertiary amines. Specific catalysts which are useful in the present invention are triethyl amine, diazabicyclo (2,2,2) octane (DABCO), diazabicyloundecene (DBU) and tetramethyl guanidine (TMG). The preferred catalysts are DBU and TMG. The reaction time when utilizing the organic amine catalysts, and particularly the organic tertiary amine catalysts, is in general between about one hour to about 20 hours which is a considerable difference compared to using no amine catalyst.

The amount of organic amine catalyst is not particularly critical providing that a catalytic effective amount is used. However, in general it may be said that the amount of catalyst will be between 0.001 weight percent and 3 weight percent, based on the total weight of the starting reactants. It should be noted, however, that if more than about 0.1 weight percent catalyst is used this may alter the curing rate of the sealant composition. It is, of course, possible to remove the organic amine catalyst to reduce the content thereof to less than 0.1 weight percent prior to compounding but it is generally preferred to use less than 0.1 weight percent in the cleavage reaction in order to avoid possible later problems.

In order to obtain the thioether mercaptan terminated disulfide liquid polymer composition R' is a divalent organic thioether, preferred thioethers being divalent alkyl thioethers of from 4 to 20 carbon atoms such as —CH$_2$—CH$_2$—S—CH$_2$—CH$_2$—.

The thioether mercaptan terminated disulfide liquid polymer composition consisting essentially of from about 10 mole percent to about 75 mole percent of diethyl formal mercaptan terminated polysulfide and from about 90 mole percent to about 25 mole percent of thioether mercaptan terminated disulfide polymer have a number of improved characteristics not found in the conventional diethyl formal mercaptan terminated polysulfide. Some of these advantages have been enumerated hereinbefore but it should be emphasized that formulations which do not need solvents, as is the case here when the molecular weight is less than about 2,500, is a tremendously significant advantage, particularly when coupled with high strength, good adhesion, and superior thermal resistance of the cured elastomer.

If all of the foregoing advantages are not necessary for a particular purpose, and the primary factor is to have a thermally stable elastomer, then R' in the organic dimercaptan cleaving compounds of the formula R'(SH)$_2$ will have the same significance as set forth above. The preferred R' divalent groups are as follows: —CH$_2$—CH$_2$—; —CH$_2$—CH$_2$—O—CH$_2$—CH$_2$—; —CH$_2$—CH$_2$—S—CH$_2$—CH$_2$—; —CH$_2$—CH$_2$—O—CH$_2$—CH$_2$—O—CH$_2$—CH$_2$—; and —CH$_2$—C$_6$H$_4$—CH$_2$—.

Specific organic dimercaptan cleaving compounds which may be used in the present invention are: ethane dithiol, dimercapto diethyl ether, dimercapto diethyl sulfide, triglycol dimercaptan and xylylidine dimercaptan.

The curing of the chemically modified disulfide liquid polymer composition or the mercaptan disulfide polymer of the present invention is accomplished in the same manner as conventional mercaptan terminated polymers and, specifically, so called Thiokol polysulfides. These curing procedures are well known and widely used. For example, U.S. Pat. No. 3,629,206 exemplifies certain curing procedures. The cure procedures include two component oxidation and epoxide addition cures. The disulfide polymer compositions of the present invention, when cured by conventional methods exhibit better thermal stability and the thioether mercaptan disulfide liquid polymer compositions produce sealants which have better physical properties and greater tensile strength both before and after environmental exposure to water and fuel. They also exhibit improved thermal resistance over the Thiokol polysulfide polymers.

In order to more fully illustrate the invention there is given below presently preferred embodiments. In these embodiments, parts are by weight, and temperatures are in centigrade, pounds per square inch is abbreviated PSI and pounds per linear inch is abbreviated PLI, unless otherwise specified. In the following exemplary preferred embodiments, DBU is diazabicyloundecene and TMG is tetramethyl guanidine.

EXAMPLE 1

3,579 parts by weight of Thiokol LP-32 were mixed with 175.7 parts by weight of ethane dithiol and 0.039 parts by weight of DBU. This mixture was placed in a container and covered with a nitrogen atmosphere and then heated at 75° C. for 2.5 hours at which point the original viscosity of 45,000 centipoise dropped to 2,900 centipoise, further heating produced no further decrease in viscosity. Gel permeation chromatography gave a number average molecular weight of 1,400.

EXAMPLE 2

The procedure of example 1 was followed identically except there was used 3,570 parts by weight of LP-32 and 175.7 parts by weight of ethane dithiol. There was no DBU added. In order for the viscosity to drop as low as the 2,900 centipoise of Example 1, 40 hours of heating at 70° C. was required.

EXAMPLE 3

3,891 parts of LP-32 were mixed with 307 parts by weight of hexane dithiol and 0.039 parts by weight of DBU. The mixture was covered by a nitrogen atmosphere and heated at 70° C. for 5.5 hours, the viscosity dropping from 45,000 centipoise to 3,000 centipoise.

EXAMPLE 4

2,377 parts by weight of Thiokol LP-2 was used in this example. The 2,377 parts by weight of LP-2 were mixed with 188.9 parts by weight of dimercapto diethyl sulfide and 0.048 parts by weight of DBU. After heating at 70° C. for 13 hours the viscosity dropped from 45,000 to 2,930 centipoise.

EXAMPLE 5

3,000 parts by weight of LP-2 were mixed with 148 parts by weight of ethane dithiol and heated at 80° C. for 69 hours at which time the viscosity dropped from 45,000 centipoise to 2,800 centipoise.

EXAMPLE 6

2,602 parts by weight of LP-2 were mixed with 256.8 parts by weight of dimercapto dioxaoctane and 0.052 parts by weight of DBU. After heating for 13 hours at 70° C. the viscosity dropped from 45,000 to 2,350 centipoise.

EXAMPLE 7

253 parts by weight of LP-2 were mixed with 25.2 parts by weight of dipentene dimercaptan and 0.005 parts by weight of DBU. After six hours heating at 70° C., the viscosity dropped from 45,000 to 5,400 centipoise. An identical mixture without DBU was heated at 82° C. for 112 hours before the viscosity dropped to 5,400 centipoise.

EXAMPLE 8

200 parts by weight of LP-2 were mixed with 14.2 parts by weight of dimercapto diethyl ester without utilizing any organic amine catalyst. After 81 hours of heating at 70° C. the viscosity dropped from 45,000 to 2,980 centipoise.

EXAMPLE 9

3,715.2 parts by weight of LP-32 were mixed with 295.4 parts by weight of dimercapto diethyl sulfide and 0.037 parts by weight of DBU. After heating at 70° C. for 5 hours the viscosity dropped from 45,000 centipoise to 3,540 centipoise.

EXAMPLE 10

Example 9 was repeated except that the DBU catalyst was omitted. The mixture was heated at about 80° C. for 70 hours before the viscosity dropped to 3,540 centipoise.

EXAMPLE 11

200 parts by weight of LP-32 were mixed with 9.84 parts by weight of ethane dithiol and 0.002 parts by weight of tetramethyl guanidine (as catalyst). After 17.5 hours of heating at 70° C. the viscosity dropped from 45,000 centipoise to 2,900 centipoise.

COMPARISON OF PROPERTIES

EXAMPLE 12

100 grams of Thiokol LP-3, a 1,000 molecular weight commercial polysulfide, was mixed with 10% by weight of catalyst, DMP-30, which is 2,4,6-tri(dimethylamino ethyl) phenol and 100 parts by weight of an epoxy resin sold by Shell Chemical Company under the name of Epon 828. This identical formulation was used substituting LP-3 with the polymers of Examples 4, 5 and 6, with the following results:

|  | LP-3 | Ex. 4 | Ex. 5 | Ex. 6 |
| --- | --- | --- | --- | --- |
| Hardness after 12 weeks exposure at 180° F. (Shore "D") | 40 | 55 | 55 | 53 |

The initial hardness of the LP-3 polymer and the polymers of Examples 4 through 6 was about the same. The slower loss of hardness on aging at 180° F. demonstrates the improved thermal stability of the polymers of this invention.

EXAMPLE 13

As set forth in the following table, two identical formulations were made, the first one containing one part by weight of LP-2 and two parts by weight of LP-32 and the second containing one part by weight of the polymer of Ex. 4 and two parts by weight of the polymer of Ex. 9.

|  | FORMULATIONS - Parts by weight | |
| --- | --- | --- |
|  | FIRST | SECOND |
| BASE | | |
| Polymer | 55 | 55 |
| Filler | 33 | 33 |
| Phenolic Adhesion Promoter | 7 | 7 |
| Titanium Dioxide | 4 | 4 |
| Catalyst | 1 | 1 |
| ACCELERATOR | | |
| Manganese Dioxide | 5 | 5 |
| Hydrogenated Terphenyl (Monsanto HB-40) | 5 | 5 |

The above compositions were cast as ⅛" sheets and exposed to hot aromatic fuel containing 30% toluene, 70% isooctane along with traces of mercaptans and disulfides known as jet reference fuel (JRF) and the properties tested as set forth below.

|  | PHYSICAL PROPERTIES | |
| --- | --- | --- |
|  | FIRST | SECOND |
| Tensile Strength, PSI | | |
| Initial | 318 | 509 |
| 14 days @ 140° F. in JRF | 181 | 323 |

| | PHYSICAL PROPERTIES | |
|---|---|---|
| | FIRST | SECOND |
| 2 hrs @ 400° F. | reverted to liquid | 110 |
| Elongation, % | | |
| Initial | 300 | 270 |
| 14 days @ 140° F. in JRF | 300 | 350 |
| 2 hrs @ 400° F. | reverted to liquid | 50 |
| Tear Strength Lbs/inch | 44 | 74 |
| Modulus, PSI | | |
| 100% | 153 | 278 |
| 200% | 243 | 380 |
| Peel Strength, PLI | | |
| Dry | 43 | 30 |
| After Immersion in JRF (7 days at 140° F.) | 26 | 45 |

EXAMPLE 14

| | FORMULATIONS - Parts by weight | | |
|---|---|---|---|
| | A | B | C |
| BASE | | | |
| LP-32 | 100 | | |
| LP-3 | | 100 | |
| Polymer of Example 9 | | | 100 |
| Phthalate Ester Plasticizer (Monsanto Chemical Co. Santicizer 278) | 12 | 12 | 12 |
| Titanium Dioxide | 3 | 3 | 3 |
| Calcium Carbonate | 184 | 184 | 184 |
| Mercapto Silane (Union Carbide A-189) | 0.4 | 0.4 | 0.4 |
| Solvent (MEK) | 0.5 | 0.5 | 0.5 |
| Initial viscosity poise @ 77° F. | 4,960 | 2,160 | 1,840 |
| ACCELERATOR | | | |
| Manganese dioxide | 5 | 5 | 5 |
| Hydrogenated terphenyl (Mosanto HB-40) | 5 | 5 | 5 |
| Work Life | 10 min. | 15 min. | 30 min. |

The lower viscosity sealants of this invention provide better application properties than are available from the standard LP-32 polymer.

The following tensile strength values were determined on 100 mil sheets cured 3 days at 120 degrees F.

| Tensile strength, PSI | 250 | 180 | 330 |
|---|---|---|---|

EXAMPLE 15

This example compares the performance of LP polymers with the polymer composition of Example 9 as two component insulating glass sealants.

| | FORMULATIONS-Parts by weight | | |
|---|---|---|---|
| | D | E | F |
| BASE | | | |
| LP-32 | 45.4 | | |
| LP-3 | | 45.4 | |
| Polymer Example 9 | | | 45.4 |
| Calcium Carbonate | 54.5 | 54.5 | 54.5 |
| Mercapo Silane | 0.1 | 0.1 | 0.1 |
| ACCELERATOR | | | |
| Manganese Dioxide | 5.0 | 5.0 | 5.0 |
| Ditridecyl phthalate | 4.0 | 4.0 | 4.0 |
| Calcium Carbonate | 1.0 | 1.0 | 1.0 |

Tensile block specimens of the formulations were prepared by mixing 10 parts by wt. of Base to one part by wt. of accelerator and casting specimens between two 2"×2" glass plates to form a cured block of sealant ½"×½"×2" and equidistant from opposite edges of the plates. The tensile test is conducted by pulling the plates apart at two inches per minute until failure occurs.

| Tensile Block, Tensile Strength PSI | 120 | 75 | 150 |
|---|---|---|---|

Peel strength determinations are made by casting the mixed base and accelerator on glass panels 1"×5" to a thickness of 0.06 inches. A 10" long strip of 0.005" aluminum foil is laid on the wet sealant and the assembly is cured for 3 days at 120° F. The effect of ultra-violet light is determined by exposing the glass side of the coated panels to sun lamps emitting 365 nm.

| Peel Strength after UV exposure for 7 days, PLI | 15 | 3 | 18 |
|---|---|---|---|

The LP-3 polymer produces greatly inferior performance in UV exposure as well as in tensile block tests.

We claim:

1. A liquid polymer composition curable to a solid elastomer having excellent thermal stability, said composition consisting essentially of a polymeric mixture of
    (a) from 90 mole percent to 25 mole percent of mercaptan terminated disulfide polymer of the formula HS(RSS)$_m$R'SH and
    (b) from 10 mole percent to 75 mole percent of diethyl formal mercaptan terminated polysulfide polymer of the formula HS(RSS)$_n$RSH; wherein in the formulae R is $-C_2H_4-O-CH_2-O-C_2H_4-$; R' is a divalent member selected from the group consisting of alkyl of from 2 to 12 carbon atoms; alkyl thioether of from 4 to 20 carbon atoms; alkyl ether of from 4 to 20 carbon atoms and one oxygen atom; alkyl ether of from 4 to 20 carbon atoms and from 2 to 4 oxygen atoms each of which is separated from the other by at least 2 carbon atoms, alicyclic of from 6 to 12 carbon atoms and aromatic lower alkyl; and the value m and n is such that the diethyl formal mercaptan terminated polysulfide polymer and the mercaptan terminated disulfide polymer have an average molecular weight of between about 1,000 and about 4,000.

2. A liquid polymer composition according to claim 1 wherein the value of m and n is such that the diethyl formal mercaptan terminated polysulfide polymer and mercaptan terminated disulfide polymer have a molecular weight of between about 1,000 and about 2,500.

3. A liquid polymer composition according to claims 1 or 2 wherein R' is a divalent member selected from the group consisting of alkyl of from 2 to 12 carbon atoms; alkyl thioether of from 4 to 20 carbon atoms; alicyclic of from 6 to 12 carbon atoms and aromatic lower alkyl.

4. A liquid polymer composition according to claims 1 or 2 wherein the diethyl formal mercaptan terminated polysulfide is present in an amount from about 50 mole percent to about 10 mole percent and the mercaptan terminated disulfide polymer is present in an amount of from about 50 mole percent to about 90 mole percent.

5. A liquid polymer composition curable to a solid elastomer having excellent thermal stability, good adhesion after exposure to fuel and high strength, said composition consisting essentially of a polymeric mixture of
   (a) from 90 mole percent to 25 mole percent of thioether mercaptan terminated disulfide polymer of the formula $HS(RSS)_mR'SH$ and
   (b) from 10 mole percent to 75 mole percent of diethyl formal mercaptan terminated polysulfide polymer of the formula $HS(RSS)_nRSH$; wherein in the formulae R is $-C_2H_4-O-CH_2-O-C_2H_4-$; R' is a divalent alkyl thioether of from 4 to 20 carbon atoms and the value of m and n is such that the diethyl formal mercaptan terminated polysulfide and the thioether mercaptan terminated disulfide polymer have an average molecular weight of between about 1,000 and about 4,000.

6. A liquid polymer composition according to claim 5 wherein the value of m and n is such that the diethyl formal mercaptan terminated polysulfide polymer and thioether mercaptan terminated disulfide polymer have a molecular weight of between about 1,000 and about 2,500.

7. A liquid polymer composition according to claims 5 or 6 wherein the thioether mercaptan terminated disulfide polymer is present in an amount of from about 90 mole percent to about 50 mole percent and the diethyl formal mercaptan terminated polysulfide is present in an amount of from about 50 mole percent to 10 mole percent.

8. A liquid mercaptan terminated disulfide polymer curable to a solid elastomer having excellent thermal stability, said mercaptan terminated disulfide polymer having the formula $HS(RSS)_mR'SH$ wherein R is $-C_2H_4-O-CH_2-O-C_2H_4-$; R' is a divalent member selected from the group consisting of alkyl of from 2 to 12 carbon atoms; alkyl thioether of from 4 to 20 carbon atoms; alkyl ether of from 4 to 20 carbon atoms and one oxygen atom; alkyl ether of from 4 to 20 carbon atoms and from 2 to 4 oxygen atoms each of which is separated from the other by at least 2 carbon atoms, alicyclic of from 6 to 12 carbon atoms and aromatic lower alkyl; and the value of m is such that mercaptan terminated disulfide polymer has a molecular weight of between 1,000 to about 4,000.

9. A liquid mercaptan terminated disulfide polymer according to claim 8 wherein the value of m is such that the mercaptan terminated disulfide polymer has a molecular weight of between about 1,000 to about 2,500.

10. A liquid mercaptan terminated disulfide polymer according to claims 8 or 9 wherein R' is a divalent member selected from the group consisting of alkyl of from 2 to 12 carbon atoms, alkyl thioether of from 4 to 20 carbon atoms, alicyclic of from 6 to 12 carbon atoms and aromatic lower alkyl.

11. A liquid thioether mercaptan terminated disulfide polymer curable to a solid elastomer having excellent thermal stability, good adhesion after exposure to fuel and high strength, said thioether mercaptan terminated disulfide polymer having the formula $HS(RSS)_mR'SH$ wherein R is $-C_2H_4-O-CH_2-O-C_2H_4-$; R' is a divalent alkyl thioether having from 4 to 20 carbon atoms and the value of m is such that the thioether mercaptan terminated disulfide polymer has a molecular weight of between about 1,000 and about 4,000.

12. A thioether mercaptan terminated disulfide polymer according to claim 11, wherein the value of m is such that the thioether mercaptan terminated disulfide polymer has a molecular weight of between about 1,000 and 2,500.

13. A thioether mercaptan terminated disulfide polymer according to claims 11 or 12 wherein R' is $-CH_2-CH_2-S-CH_2-CH_2-$.

14. A method for producing a liquid polymer composition curable to a solid elastomer having excellent thermal stability which consists essentially of a polymeric mixture of
   (a) from 90 mole percent to 25 mole percent of mercaptan terminated disulfide polymer of the formula $HS(RSS)_mR'SH$ and
   (b) from 10 mole percent to 75 mole percent of diethyl formal mercaptan terminated polysulfide polymer of the formula $HS(RSS)_nRSH$; wherein in the formulae R is $-C_2H_4-O-CH_2-O-C_2H_4-$; R' is a divalent member selected from the group consisting of alkyl of from 2 to 12 carbon atoms; alkyl thioether of from 4 to 20 carbon atoms; alkyl ether of from 4 to 20 carbon atoms and one oxygen atom; alkyl ether of from 4 to 20 carbon atoms and from 2 to 4 oxygen atoms each of which is separated from the other by at least 2 carbon atoms, alicyclic of from 6 to 12 carbon atoms and aromatic lower alkyl; and the value m and n is such that the diethyl formal mercaptan terminated disulfide polymer and the mercaptan terminated polysulfide polymer have an average molecular weight of between about 1,000 and about 4,000, which comprises
   forming a reaction admixture consisting essentially of
   (1) reactant one having the formula $HS(RSS)_mRSH$ wherein R has the same significance as set forth above and the value of m is such that said reactant has a molecular weight of between about 2,000 and about 8,000; (2) a reactant two having the formula $R'(SH)_2$ wherein R' has the same significance as set forth above, the molar ratio of reactant two to reactant one being 0.3:1 to 7:1, and (3) a catalytic effective amount of an organic amine catalyst having a pKb value of at least about 10;
   the temperature of said reaction mixture being at least ambient.

15. A method according to claim 14 wherein the value of m and n is such that the average molecular weight of diethyl formal mercaptan terminated polysulfide polymer and the mercaptan terminated disulfide polymer is between about 1,000 and about 2,500.

16. A method according to claims 14 or 15 wherein the temperature of the reaction admixture is between about 25° C. and 100° C.

17. A method according to claims 14 or 15 wherein the organic amine catalyst is an organic tertiary amine.

18. A method according to claim 17 wherein the organic tertiary amine is selected from the group consisting of diazabicyloundecene and tetramethyl guanidine.

19. A method for producing a liquid polymer composition curable to a solid elastomer having excellent thermal stability which consists essentially of a polymer mixture of (a) from 90 mole percent to 25 mole percent of mercaptan terminated disulfide polymer of the formula HS(RSS)$_m$R'SH and
(b) from 10 mole percent to 75 mole percent of diethyl formal mercaptan terminated polysulfide polymer of the formula HS(RSS)$_n$RSH; wherein in the formulae R is —C$_2$H$_4$—O—CH$_2$—O—C$_2$H$_4$—; R' is a divalent alkyl thioether of from 4 to 20 carbon atoms and the value of m and n is such that the diethyl formal mercaptan terminated disulfide polymer and the mercaptan terminated polysulfide polymer have an average molecular weight of between about 1,000 and about 4,000, which comprises forming a reaction admixture consisting essentially of (1) reactant one having the formula HS(RSS)$_m$RSH wherein R has the same significance as set forth above and the value of m is such that said reactant has a molecular weight of between about 2,000 and about 8,000; (2) reactant two having the formula R'(SH)$_2$ wherein R' has the same signficance as set forth above, the molar ratio of reactant two to reactant one being 0.3:1 to 7:1, and (3) a catalytic effective amount of an organic amine catalyst having a pKb value of at least about 10;

the temperature of said reaction mixture being at least ambient.

20. A method according to claim 19 wherein the value of m and n is such that the average molecular weight of diethyl formal mercaptan terminated polysulfide polymer and the mercaptan terminated disulfide polymer is between about 1,000 and about 2,500.

21. A method according to claims 19 or 20 wherein the temperature of the reaction admixture is between about 25° C. and 100° C.

22. A method according to claims 19 or 20 wherein the organic amine catalyst is an organic tertiary amine.

23. A method according to claim 22 wherein the organic tertiary amine is selected from the group consisting of diazabicyloundecene and tetramethyl guanidine.

* * * * *